United States Patent [19]

Frischen

[11] 4,437,914
[45] Mar. 20, 1984

[54] METHOD OF PRODUCING SHEATHED CABLES AND/OR TRANSDUCERS AND A DEVICE FOR CARRYING OUT THIS METHOD

[76] Inventor: Franz Frischen, Kreppe 26, D-8359 Ortenburg-Dorfbach, Fed. Rep. of Germany

[21] Appl. No.: 355,455

[22] Filed: Mar. 8, 1982

[30] Foreign Application Priority Data

Mar. 10, 1981 [DE] Fed. Rep. of Germany ....... 3109101

[51] Int. Cl.³ ........................................... H01B 13/26
[52] U.S. Cl. ....................................... 156/54; 29/517; 29/825; 156/203; 156/466; 174/102 P; 228/17.5; 228/166; 428/36; 428/379
[58] Field of Search ...................... 29/400 D, 825, 517; 138/128, 151, 156; 156/54, 199, 200, 201, 203, 218, 461, 466; 174/102 P, 118; 219/544; 428/36, 399; 228/165, 166, 17.5

[56] References Cited

U.S. PATENT DOCUMENTS 3,575,748  4/1971  Polizzano ............................ 156/54
4,093,480  6/1978  Blalock et al. ...................... 156/54

Primary Examiner—Robert A. Dawson
Attorney, Agent, or Firm—Fleit, Jacobson, Cohn & Price

[57] ABSTRACT

A method of producing sheathed cables and/or transducers such as wire strain gauges, temperature probes and so on. Such cables comprise an outer tubular casing and one or more electrically conductive leads embedded in insulating material. Production begins on a flat strip which is bent by means of a female mold into a tubular shape with an approximately circular cross-section, whereby the free edges of this blank are bent back so as to form radially protruding flanges. The leads are inserted into this preformed tubular casing and the spaces are filled with insulating material in powder form. The diameter of the tube is reduced and the density of the inserted insulating material is increased by pulling on the flanges in a specially designed abutment. After the desired density is attained, the flange is cut off and the free edges are welded together. The method is preferably carried out continuously and is not only well suited for the production of sheathed cables, but also especially for the production of transducers of diverse kinds and combinations thereof in one and the same tubular casing.

20 Claims, 14 Drawing Figures

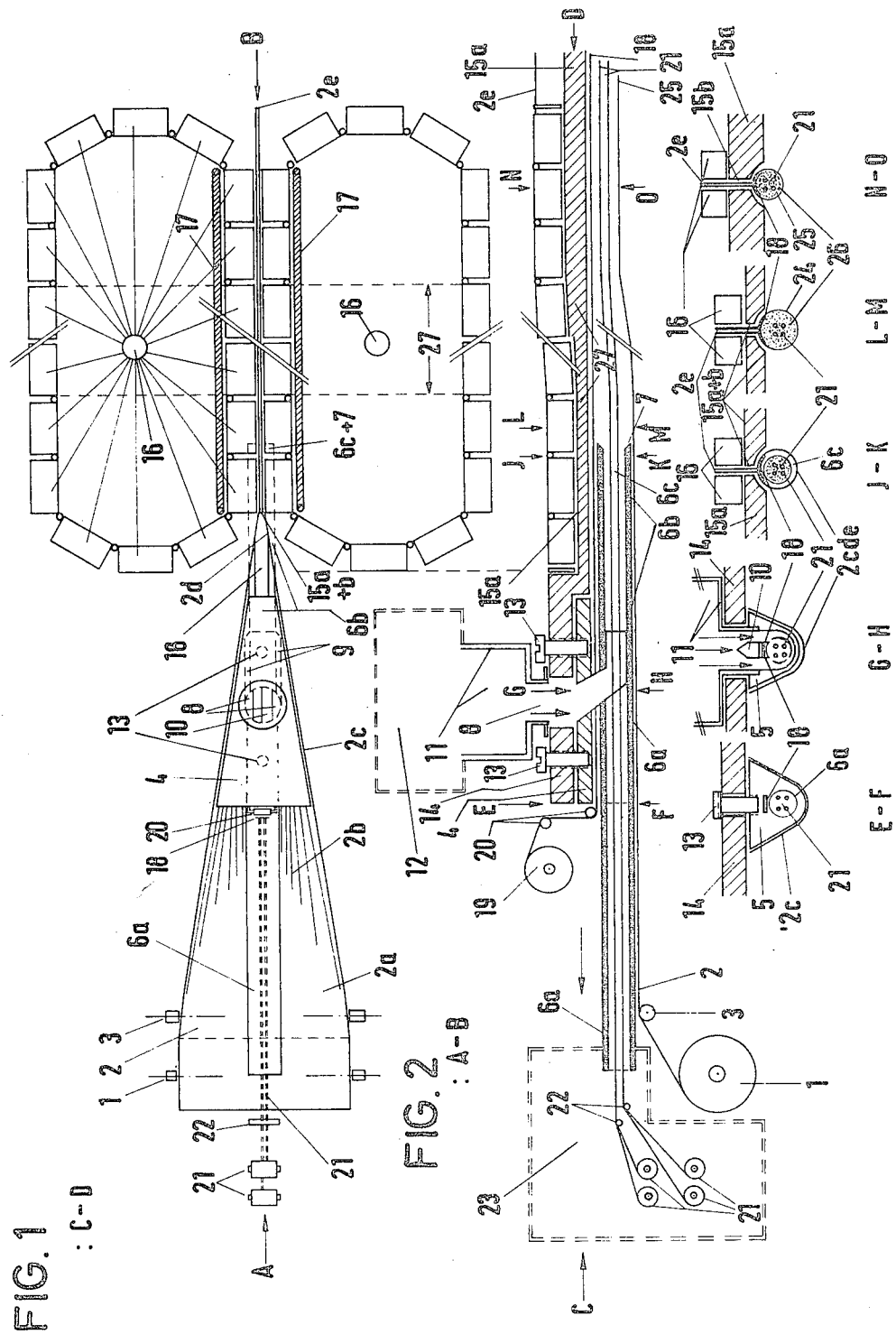

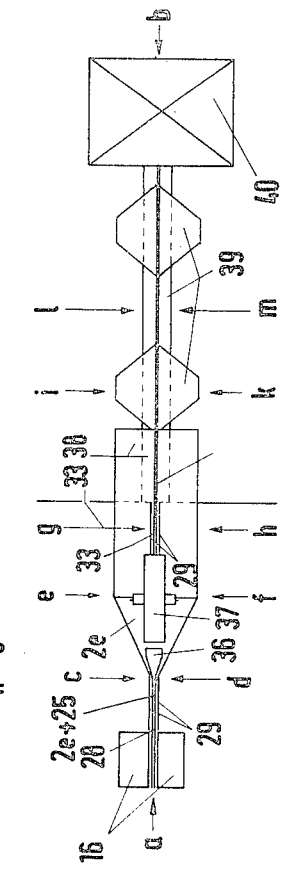
FIG. 5
n—o
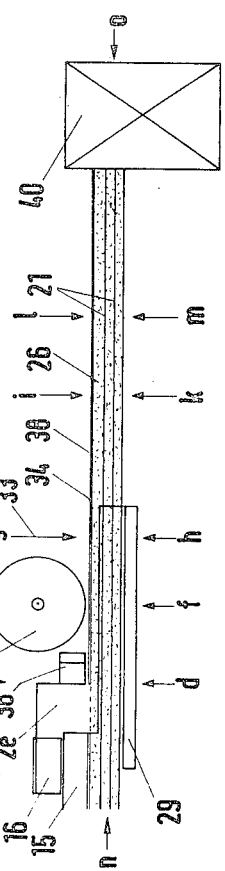
FIG. 6
a—b
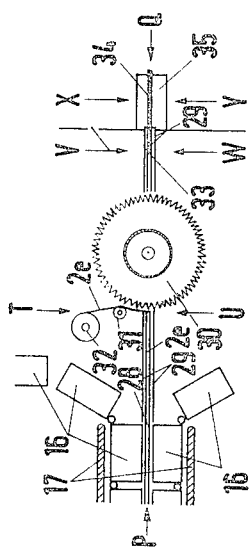
FIG. 3
R—S
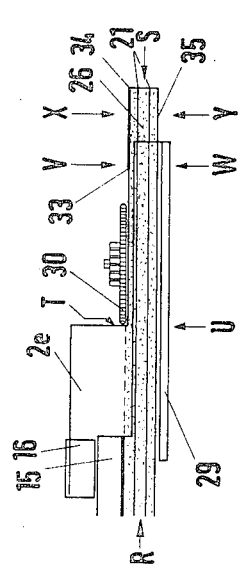
FIG. 4
P—Q

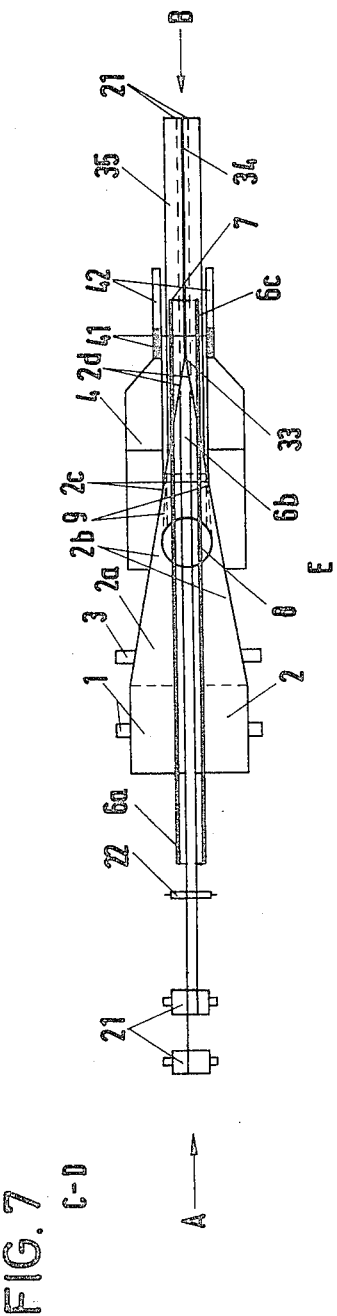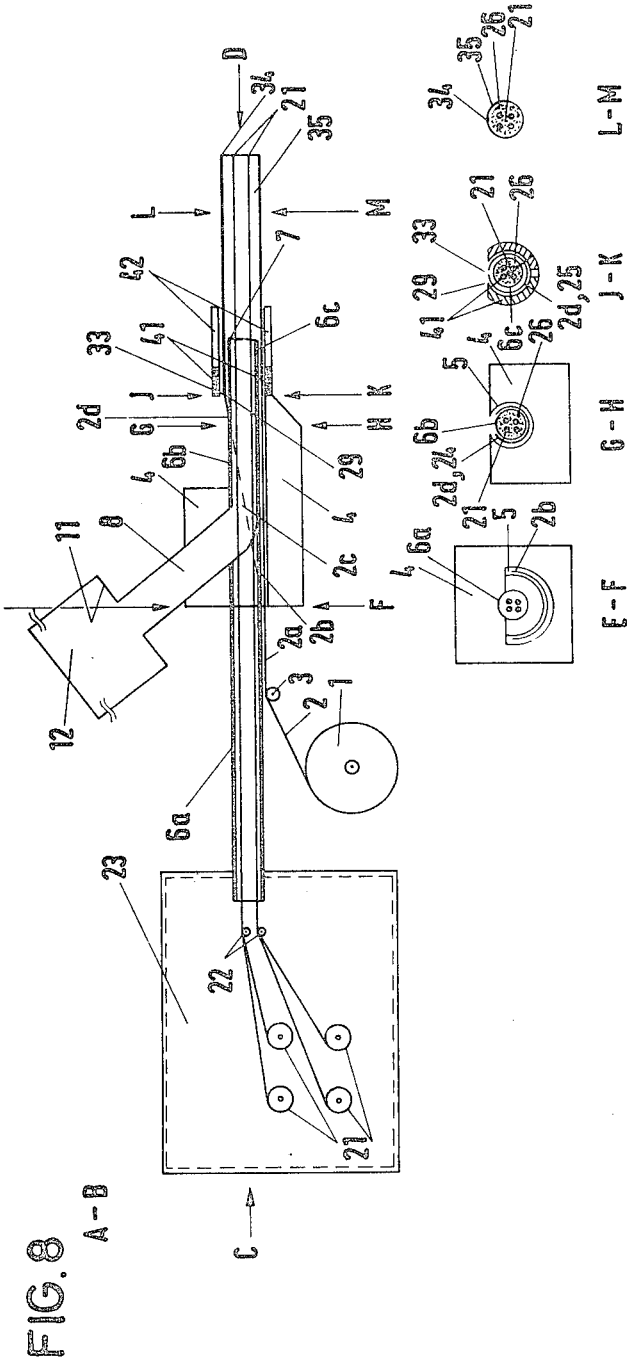

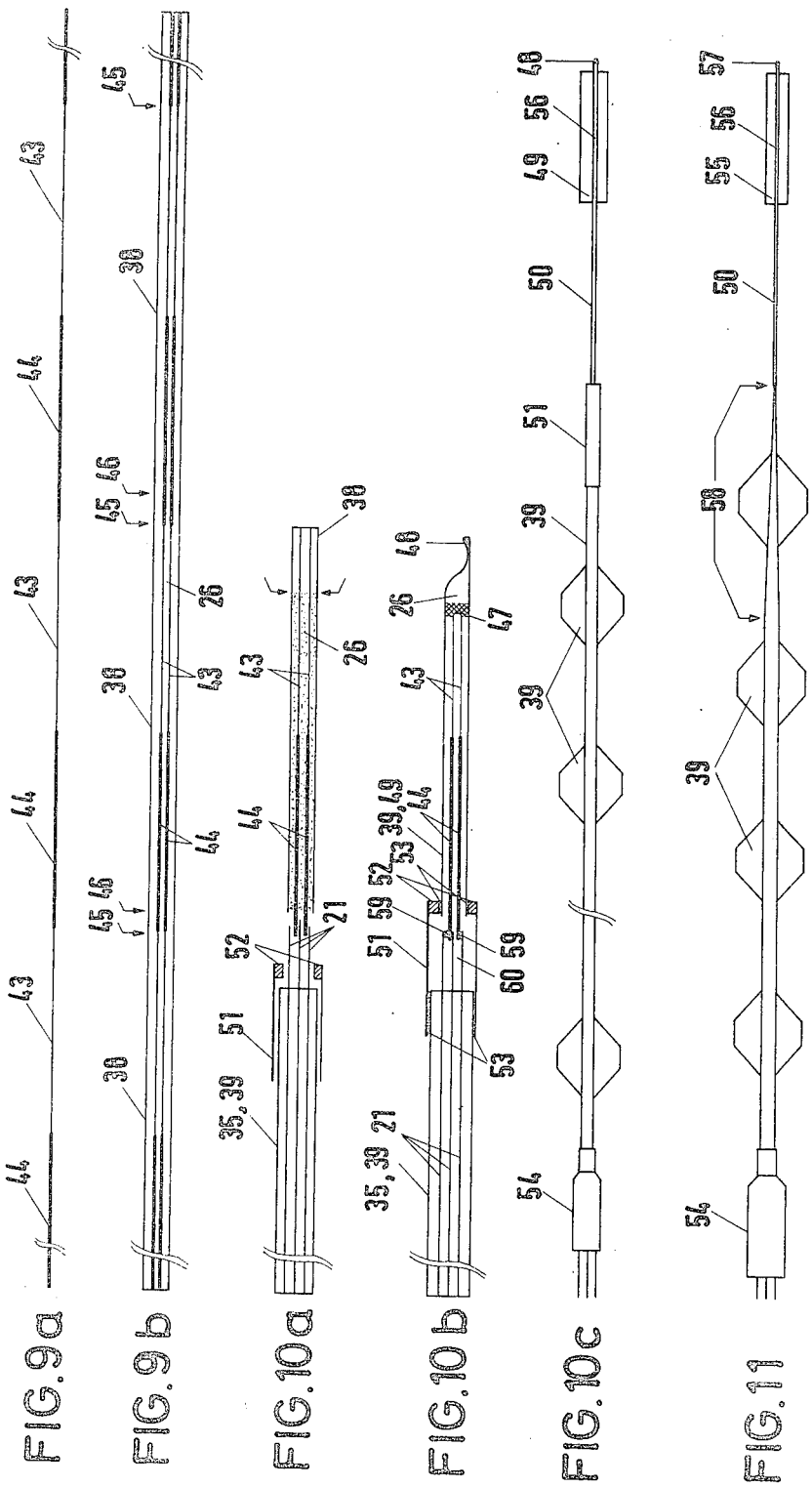

METHOD OF PRODUCING SHEATHED CABLES AND/OR TRANSDUCERS AND A DEVICE FOR CARRYING OUT THIS METHOD

The invention relates to a method of producing sheathed cables and/or transducers such as wire strain gauges, temperature probes and so on, comprising an outer casing and one or more electrically conductive lead(s) embedded in insulating material and a device for carrying out this method.

Cables encased in a metal tube are known. This type of cable generally has one to six leads made of pure copper, nickel-coated copper, a copper-zirconium alloy, constantan, iron, nickel chromium or other materials, depending on its particular application. The leads are insulated from each other and the tubular casing by means of a powdery material which provides sufficient insulation even at relatively high temperatures. In most cases magnesium oxide powder is used for this purpose, although aluminum oxide and other oxides, for example, have better insulating properties, especially at high temperatures. The reason for using magnesium oxide powder as an insulating material is directly related to the method of producing cables encased in metal tubes, which is described in more detail in the following.

This type of cable of drawn down to the desired dimensions in a so-called "drawings process", which increases its length, on the one hand, and reduces its cross-section, on the other, and also affects both the tubular metal sheath and the leads or wires inside the cable.

Depending on the desired cable end dimensions, i.e. cable length, cable outside diameter, wall thickness of the metal sheath, number and diameter of the leads as well as their insulating distance from each other and from the metal sheath, a suitable metal tube and a certain original wire gauge for the lead(s) are selected after calculation. So-called "beads", i.e. stick portions with one or more holes of the desired insulating material, are fit onto the leads and the latter are then lined up with the insulating pieces and inserted into the metal tube which is then closed at both ends. Now the drawing process (cold shaping) begins, alternating with annealing processes depending on the degree of deformation. During this draft the "beads" of insulating material used are totally crushed and transformed into a highly compressed powder.

The above-mentioned process, which is technically and economically extravagant, involves considerable material stress. Thus in particular the cable leads are greatly damaged—as in the case of all sheathed cables produced in this manner—which is mainly due to the relative coarseness and hardness of the insulating material chosen. As magnesium oxide powder, for example, causes less damage to the leads during draft, it is used most often, although aluminum oxide and other oxides have greatly superior insulating properties, as mentioned above.

A further disadvantage of leads damaged in this way emerges during the subsequent use of this type of cable sheathed in metal tubing. Especially at relatively high temperatures the variation in resistance unproportional to the temperature becomes noticeable from lead to lead, which raises doubts about the accuracy of measurements. Therefore special steps, involving increased expenditures, are necessary in each case in order to reduce or compensate such errors of measurement.

Cables sheathed in metal tubing, with one or more leads, are used in many different ways, especially at high temperatures and under difficult environmental conditions, such as in high-pressure superheated steam, sodium, corrosive gases and other media. They serve as:

(a) measuring cables for the construction of transducers, for example, wire strain gauges, pressure and force transducers, resistance temperature probes, etc.
(b) thermocouple cables for temperature measurements
(c) electric resistance cables, for example, for heating coils, immersions heaters, etc.
(d) coaxial cables for HF technology and so on.

The invention is based on the problem of providing a new method of producing this type of sheathed cable. The method should be technologically simplified relative to the known method. The cables produced by the method should also be much improved and less susceptible to disturbances.

This problem is solved according to the invention by the features stated in the characterizing part of the new main claim. The crucial point is the finding that it is unnecessary to proceed from a finished piece of tube having a certain length which is then subjected to a complicated drawing process in order to attain its final packing density; instead, lamellar material is used which is first given a tubular shape, to which the leads and insulating material are applied, and then this tube blank is welded along a seam parallel to its axis so as to be hermetically sealed. The method according to the invention can be varied in many ways; production in steps, for example, is quite feasible for small-scale series. When carried out as a continuous process, however, it combines the most advantages. The method according to the invention also offers the possibility of achieving other desirable goals, as well, such as have not been attainable by draft up to now.

The general advantages of the method are mainly that the deformation of the sheath is minimal. The cable leads are spared practically all damage since they are not drawn down, i.e. there is no longitudinal deformation and the insulating material is compressed perpendicular to the longitudinal axis of the cable. The insulation values of a cable produced by the method according to the invention are much better, especially at high temperatures, since aluminum oxide and other superior insulating materials can be used.

As the method according to the invention allows for the cable leads or wires to be pre-insulated before being introduced into the tubular sheath, higher packing density, a relatively small cable diameter and higher insulation values can be attained.

The method according to the invention also offers the possibility of vacuum production, which not only assures that the sheath is better filled with insulating material, but also a completely dry production and the possibility of carrying out a helium leak test.

The method according to the invention can be used to produce not only normal sheathed cables, but also high-temperature wire strain gauges in a cable construction as quarter links or high-temperature wire strain gauges with two active strain gauge wires integrated to a full link in one and the same cable. Wire strain gauges with temperature probes on a thermocouple or resistance basis can also be combined in the cables to determine strain and temperatures simultaneously. The temperature probes can also be used to compensate the error caused by apparent strain.

The method according to the invention is worked out so as to allow for the production in one and the same production sequence of a measuring cable with embedded high-temperature wire strain gauges, thermocouple probes and resistance thermometers. Thus the total integration of measuring element(s) in one measuring cable is possible.

BRIEF DESCRIPTION OF THE DRAWINGS

In the following, embodiments of the invention are described by way of example with reference to the adjoined drawings. These show:

FIG. 1 illustrates a schematic top view of a device for carrying out the method.

FIG. 2 illustrates a schematic axial section of the device, and cross-sections at five different places along the longitudinal axis of the device.

FIG. 3 illustrates a schematic top view of the last units of the production sequence in the device as in FIGS. 1 and 2.

FIG. 4 illustrates an axial section of the portion of the device in FIG. 3 with cross-sections at three different places along the longitudinal axis.

FIG. 5 illustrates a top view of the last units of the production sequence of a device in a modified design.

FIG. 6 illustrates a schematic axial section of the portion of the device as in FIG. 5 and cross-sections at five different places along the longitudinal axis of the device.

FIG. 7 illustrates a schematic top view of a further embodiment of the device.

FIG. 8 illustrates a schematic axial section of the device as in FIG. 7 with cross-sections at four different places along the longitudinal axis of the device.

FIGS. 9a,b shows intermediate stages of a sheathed cable for the production of transducers.

FIGS. 10a, b and c show a connection of the transducer as in FIGS. 9a and 9b with a sheathed cable produced by a modification of the method according to the invention.

FIG. 11 illustrates a sheathed cable with a totally integrated wire strain gauge and a diameter tapering into the wire strain gauge.

DETAILED DESCRIPTION OF THE DRAWINGS

As in FIG. 1, a metal or plastic tape 2 is pulled off roller 1 and then directed over guide pulley 3 to tube molding and tube filling head 4. This head has a molding tub or bed 5 and a tube 6 in it which passes through and has a guide portion 6a, a molding portion 6b and a filling portion 6c. There is a filler neck 8, extended by lateral channels 9, between the guide and molding portions 6a,b. Filler neck 8 communicates with a closed container 11 containing the insulating material and integrated into a helium pressure chamber 12. In the area of filler neck 8 there is a lid 10 covering a certain area to the right and left of a central generator. The function of this fin will be discussed in the following.

A sheet metal or plastic strip 2 is molded to a tube (2a-d) in the tube molding and tube filling head 4, whereby the free edges of the strip are bent back in the form of flanges 2e projecting radially outwards or upwards. Section E-F shows molding bed 5 with V-shaped bent back strip 2c; Section G-H shows a cross-section in the area of filler neck 8, in which the position of lid 10 is also apparent.

Adjacent to tube molding and tube filling head 4 there is a carousel gripping device 16 comprising two jaw chains directed in an endless loop which, running between guide tracks 17, define a conveying track in which upwardly projecting flanges 2e of strip 2 molded to a tube are gripped and kept frictionally engaged.

End 7 of the guide, molding and filling tube 6a,b,c extends into the area of the gripping device. Synchronously with the formation of the strip to a tube as described above, cover band 18 is unwound from roller 19 over guide rollers 20 and directed through tube molding and tube filling head 4 into the performed tube 2c,d with flange 2e. Cover band 18 is placed in such a way that it covers the top of the gap formed by the two flanges 2e. The strip is protected and guided by lid 10 in the area of filler neck 8. The position of strip 2 is shown in sections J-K, L-M and N-O.

Synchronously to this, cable leads 21 are threaded over guide rollers 22. Outside pressure chamber 23 they reach preformed sheath 2c,d,e through closed guide, molding and filling tube 6a,b,c.

Cable sheath 24 is filled with insulating material 26 via filler neck 8 and lateral channels 9 (see section G-H and FIG. 2). The insulating material reaches the completed sheath 24 with flanges 2e via end 7 of filling tube 6c (see section L—M). This process can be adjusted in doses via the vacuum already existing in tube 24, on the one hand, and pressure 12 in insulating material container 11, on the other, whereby air is continuously evacuated. In the process cover band 18 is automatically pressed onto the slot of the tube bulge of flange 2e, seals it off and thus prevents contamination by insulating material 26, which could have serious consequences. The prevention of contamination is especially important with respect to the subsequent welding of the tubular sheath. The introduction of the insulating material through filling tube 6c into sheath 24 can be supported by a slanted position and appropriate vibration of guide, molding and filling tube 6a,b,c and thus also of sheath 24.

In order to achieve as high a compression of the insulating material 26 as possible in sheath 24, the latter is gripped at its flange 2e by jaws 16 running the opposite way of the carousel gripping device, whereby the jaws run between guide tracks 17 and clamp flanges 2e. Sheath 24 is put against abutment 15a in the process (see section L-M). Jaws 16 run along abutment 15a, whereby clamped flange 2e is drawn upwards by jaws 16. Due to the gradually ascending slope 27 of the abutment, flange 2e is drawn upwards and sheath 24 is tapered accordingly, or rather its diameter is reduced (see section N-O). Since upgrade 27 of the abutment is continuously adjustable, i.e. it can be altered during the production sequence, sheath 24 can be widened conically or tapered, whereby the insulating material 26 can be inserted into sheath 24 in corresponding doses and adapted to the differing diameter at the same time. In order to overcome relatively large differences in the cable diameter, guide, molding and filling tube 6a,b,c can also consist of several parts, i.e. several lengths of tube overlapping each other which can be pulled apart like a telescope. In order to compensate the radial distance between molding and filling tube 6b,c and abutment 15a, which would then be altered, attachment plate 14 is arranged so as to be vertically adjustable relative to the latter. The same holds true of guide rollers 22 of cable leads 21 so that the latter remain centered. Similarly, cover band 18 is also directed over guide rollers. In this way all possible combinations are maximally assured, and different cable diameters and seamless transitions 58 from one cable diameter to another can be processed in rapid succession, whereby the thickness of insulating material 26 can be adjusted so as to be constant or varying.

After leaving carousel gripping device 16, cable 25 with flange 2e reaches at end 28 of abutment 15a a guide groove 29, the walls of which hold the cable firmly closed all the way around and including flange 2e. Saw blade 30 arranged horizontally above the guide groove cuts off upwardly extending flanges 2e which are wound onto rollers 31 and 32. The edges of the tube which are now free are welded at 33. These units are shown schematically in FIGS. 3 and 4 and sections T-U, V-W and X-Y. The finished cable with a tubular sheath 25 leaves guide groove 29 and is wound up. Another appropriately formed carousel gripping device can of course be used instead of the guide groove.

A further embodiment of the method, or rather a suitable device, is shown in FIGS. 5 and 6 and the corresponding sections c-d, e-f, g-h, i-k and l-m. Cable 25 with flange 2e here also reaches guide groove 29 at end 28 of the abutment, as explained above. Then wedge 29 spreads flanges 2e apart and following rolling wheel 37 presses the flanges completely flattened into a plane tangential to the sheath. The latter then goes through a welding unit, whereby at 33 the folded edges are welded together and thus the flange portions 2e are connected with the tubular sheath of the cable in a hermetically sealed manner. The finished cable with its tubular sheath 38 and flange 2e leaves the guide groove. Flange 2e, which considerably facilitates subsequent installation, can still be punched out (shown at 39), thus making the cable more flexible. In a unit 40 connected at the outlet side, an annealing process is carried out to release stress, followed by cleaning and checking of the tube.

FIGS. 7 and 8 show a further variation of a device for carrying out the method according to the invention.

Cable leads 21 run from pressure tank 23 over guide rollers 22 into guide, molding and filling tube 6a,b,c, or rather, are drawn into the tube. The latter extends through tube molding and tube filling head 4, as described above. However in this case the molding tub or molding bed 5 is not designed as the outer contour, but rather as a groove in which the metal strip wound off roller 1 is automatically guided and gradually formed to a circular shape. Filler neck 8 for the insulating material opens out in area 6b of the filling tube and is supplied from container 11, which in its turn communicates with pressure chamber 12.

The insulating material is fed into the interior of filling tube 6c supported by the pressure differences between pressure chambers 12 and 23 and the vacuum surrounding the rest of the device, and it surrounds cable leads 21 evenly on all sides. This unit is shown in section G-H, which clearly indicates how strip 2d/24 which is almost completely preformed as a circle, surrounds section 6b of filling tube 6c.

Subsequently the tubular casing is further bent around until the free edges are directly opposite each other. This phase also takes place in the area of end 7 of filling tube 6 (see section J-K). Now the free edges are welded at 33 so that a weld seam 34 is formed (cf. section J-K). Filling tube 6 only ends at position 7 when the longitudinal seam is welded. End 7 of filling tube 6 is preferably flattened out in such a way that the change of diameter does not unfavorably affect the packing density of the insulating material on the way out of the filling tube. On the other hand, there are several types of application in which the packing density need not be as high as is necessary, for example, in the production of small tubes with embedded wire strain gauges, e.g. for sheath cables proper, thermocouple elements, resistance thermometers, etc. It is also possible as a variation of this method to wind or push the strip into a spiral shape and weld it in the area of the filling tube.

Transducers such as wire strain gauges, resistance thermometers, thermocouple elements, etc. can be produced by the method according to the invention without altering the device. Combinations of the above are also possible in one and the same sheathed tube (see FIGS. 9 and 10). FIG. 11 shows, for example, a cable that becomes wider conically having a totally integrated probe, the production of which is also possible with the new method.

In the following, the production of a wire strain gauge shall be described. First an extension wire 43 is provided with gold plated areas 44 at predetermined intervals as in FIG. 9a. Two equally long sections of the prepared extension wire are processed to a cable with a tubular sheath by using the production method described above (FIG. 9b). Cable 38 is now cut open at 45 (FIG. 9b) and thus yields the X-shaped strain gauge (10a). Now cable sheath 38 is removed over a certain length (corresponding to the distance between reference numbers 45 and 46 in FIG. 9b), making the gold plated wire strain gauge wires 44 visible. At the other end insulating material 26 is blown out by means of extremely fine grained sand blasting, as shown by the arrows. This uncovers the two extension wires 43 which are welded together to a loop by means of a condenser discharge. The protruding ends are cut off and the small tube is sealed off with a stopper 47. The rest of the tubular sheath is half filled with insulating material 26 and closed off by mash welding 48. Wire strain gauge 49 produced in this way is then connected in the known manner with a cable 35 or 39 in a three-wire circuit by means of a joint box 51; wire ends 21 and 44 are welded together at 59. Joint box 51 is welded at 53 to cable 35/39, on the one hand, and to tube 39/49 of the wire strain gauge, on the other (see FIG. 10b). In this way a wire strain gauge with an integrated cable is provided, the actual size and appearance of which are shown in FIG. 10c.

FIG. 11 shows a wire strain gauge with a totally integrated cable and a conical transition 58 from cable 39 to wire strain gauge 55/56. The wire strain gauge exhibits integrated attachment flanges 55 in accordance with a variation of the method described above. Using the method according to the invention, this type of integrated cable with a transducer can be produced in one and the same production step.

What is claimed is:
1. A method of producing sheathed cables comprising:
   bending a sheet material into a tube;
   forming outwardly radial flanges of said tube parallel to an axis of said tube;
   gripping said flanges in frictional engagement by a gripping means;
   separately inserting at least one lead and an insulating material into said tube;
   drawing said flanges in a radial direction against an abutment, whereby a diameter of said tube is re- duced and said insulating material is simultaneously compressed;

inserting a cover band over said insulating material prior to said drawing of said flanges;

welding said tube along a seam parallel to said axis of said tube.

2. A method as in claim 1, wherein said tube, after leaving said gripping device, runs through a guide groove preventing the tube diameter from widening, and simultaneously said flanges are severed and said seam of said tube is welded, with said cover band.

3. A method as in claim 1, wherein said tube, after leaving said gripping device runs through a zone which prevents the tube diameter from widening, and simultaneously bending said flanges apart and putting said flanges onto a plane approximately tangential to said tube and the edges of said tube are welded together, along with said cover band.

4. A method as in claim 3, wherein said flanges, after they have been apart, are severed in sections.

5. A method as in claim 1, wherein said insulating material is in powder form inserted laterally in a molding tube and a filling tube coaxial to said tube, by means of a filler neck, while said sheet is being molded to a tube above said molding and said filling tube.

6. A method as in claim 5, wherein a guide tube, said molding tube and said filling tube are of variable diameter such that, a radial distance from an abutment is adjustable.

7. A method as in claim 6, wherein a degree of compression increases, and a diameter of said tube gradually decreases while passing said abutment.

8. A method as in claim 7, wherein said abutment is adjustable whereby when the diameter of said sheet material is constant, varying final diameters and thus varying densities of said insulating material can be set.

9. A method as in claim 7, wherein said guide tube, said molding tube, said filling tube, and said filler neck are under a pressure and the remainder of said method is carried out in a vacuum, whereby the density of said powdery insulating material is affected by coordinating said pressure and said vacuum.

10. A method as in claim 9, wherein said guide tube, said molding tube, said filling tube, and said filler neck are pressurized with helium.

11. A method as in claim 10, wherein said sheet material is molded by being pressed onto a molding bed.

12. An apparatus for producing sheathed cable comprising:
a central guide tube, a molding tube and a filling tube;
an insulating material in powder form inserted through a filler neck onto a sheet material;
said sheet material molded into a tube around said molding tube by a molding bed;
a plurality of leads drawn in a direction parallel to said tube through said filling tube;
said tube surrounds said molding tube and said filling tube;
a narrow cover band, covering a gap formed by flanges of said sheet material molded around said molding tube;
a gripping means draws said flanges against an abutment, whereby the diameter of said tube is gradually reduced and the density of said insulating material increases; and
welding means applied to edges of said tube, remaining after said flanges have been removed, located at a point near an end of said filling tube.

13. A device as in claim 12, wherein said gripping device is arranged on two endless chains directed in a loop, which hold said flanges in frictional engagement in the area of said abutment.

14. A device as in claim 12, wherein said abutment has a constantly changing profile, whereby said tube is gradually tapered when passing said abutment.

15. A device as in claim 14, wherein said abutment is adjustable.

16. A device as in claim 15, wherein said guide tube, said molding tube, and said filling tube comprise several lengths of tubing of varying diameters inserted into each other, with an adjustable distance from said abutment, adjustable by means of an attachment plate.

17. A device as in claim 16, wherein said filler neck and said guide tube, said molding tube and said filling tube vibrate.

18. A device as in claim 17, wherein after said gripping device, a guide groove is arranged, into which said tube is pushed, and a cutting device is arranged above said guide groove to remove said flanges, and a welding device is provided in the area of said guide groove to weld a longitudinal seam parallel to the axis of said tube.

19. A device as in claim 17, wherein after said gripping device a guide groove is arranged, into which said tube is pushed, and a wedge is arranged above said guide groove, with the help of which said flanges are opened, and a rolling wheel is arranged above said guide groove which bends the flanges onto a tangential plane, and a welding device is provided after said rolling wheel and a punching device to punch the flanges out in sections.

20. A device as in claim 18, wherein said gripping devie is arranged in a vacuum-proof casing which is constantly evacuated, and said filler neck, for said insulating material, and said guide tube and said molding tube and said filling tube open out into pressure tanks.

* * * * *